(12) United States Patent
Wolf et al.

(10) Patent No.: US 11,505,229 B2
(45) Date of Patent: Nov. 22, 2022

(54) TOOL SUPPORT

(71) Applicant: MILWAUKEE ELECTRIC TOOL CORPORATION, Brookfield, WI (US)

(72) Inventors: Matt R. Wolf, Milwaukee, WI (US); Ryan J. Denissen, Sussex, WI (US); Peter J. Davies, Milwaukee, WI (US); Sean T. Kehoe, Hartland, WI (US); Justin Miller, Milwaukee, WI (US); Jacqueline J. Beierle, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 798 days.

(21) Appl. No.: 16/376,258

(22) Filed: Apr. 5, 2019

(65) Prior Publication Data
US 2019/0315385 A1 Oct. 17, 2019

Related U.S. Application Data

(60) Provisional application No. 62/657,076, filed on Apr. 13, 2018.

(51) Int. Cl.
| | | |
|---|---|---|
| *B62B 5/02* | (2006.01) | |
| *B62B 1/12* | (2006.01) | |
| *B62B 5/00* | (2006.01) | |

(52) U.S. Cl.
CPC .................. *B62B 5/02* (2013.01); *B62B 1/12* (2013.01); *B62B 5/0033* (2013.01)

(58) Field of Classification Search
CPC .. B62B 1/12; B62B 5/02; B62B 5/023; B62B 5/025; B62B 5/0033; B62B 9/02;
(Continued)

(56) References Cited

U.S. PATENT DOCUMENTS

| | | |
|---|---|---|
| 1,783,256 A | 12/1930 | Miller |
| 1,918,353 A | 7/1933 | Utley |

(Continued)

FOREIGN PATENT DOCUMENTS

| | | |
|---|---|---|
| CN | 201836655 | 5/2011 |
| CN | 201844212 | 5/2011 |

(Continued)

OTHER PUBLICATIONS

International Search Report and Written Opinion for Application No. PCT/US2020/036914 dated Sep. 21, 2020 (19 pages).

(Continued)

*Primary Examiner* — Jacob D Knutson
*Assistant Examiner* — Maurice L Williams
(74) *Attorney, Agent, or Firm* — Michael Best & Friedrich LLP

(57) ABSTRACT

A tool support includes a frame that is configured to support a tool and a powered track supported on the frame. The powered track includes a drive roller, an idler roller, and an endless belt that extends around the drive roller and the idler roller. The tool support also includes a first motor supported on the frame. The first motor is operable to drive the drive roller and rotate the endless belt. The tool support further includes a second motor supported by the frame. The second motor is configured to be coupled to the tool to drive the tool supported on the frame.

15 Claims, 12 Drawing Sheets

(58) Field of Classification Search
CPC . B62B 9/04; B62B 2202/48; B62B 2301/256; B25H 3/021
See application file for complete search history.

(56) References Cited

U.S. PATENT DOCUMENTS

| | | | |
|---|---|---|---|
| 1,990,686 A | 2/1935 | Einhorn et al. |
| 2,069,871 A | 2/1937 | Blanc |
| 2,111,527 A | 3/1938 | Blanc |
| 2,115,266 A | 4/1938 | Johnson |
| 2,167,268 A | 7/1939 | Sanger |
| 2,223,005 A | 11/1940 | Kerber |
| 2,225,129 A | 12/1940 | Osborn |
| 2,244,735 A | 6/1941 | Siverman |
| 2,246,056 A | 6/1941 | McKenzie |
| 2,255,800 A | 9/1941 | Miller |
| 2,267,493 A | 12/1941 | Clotz |
| 2,282,600 A | 5/1942 | Blanc |
| 2,288,771 A | 7/1942 | Babcock |
| 2,291,253 A | 7/1942 | Osborn |
| 2,355,733 A | 8/1944 | Johnson et al. |
| 2,426,265 A | 8/1947 | Gavin |
| 2,466,493 A | 4/1949 | Sketchley |
| 2,468,490 A | 4/1949 | Joseph |
| 2,552,808 A | 5/1951 | O'Brien |
| 2,562,574 A | 7/1951 | Poekert |
| 2,610,807 A | 9/1952 | O'Brien |
| 2,619,665 A | 12/1952 | Hopkins et al. |
| 2,730,740 A | 1/1956 | O'Brien |
| 2,765,149 A | 10/1956 | Christodolu |
| 2,786,218 A | 3/1957 | Yousem |
| 2,836,838 A | 6/1958 | Kollmann |
| 2,880,435 A | 4/1959 | Deutsch et al. |
| 2,926,372 A | 3/1960 | O'Brien |
| 2,930,584 A | 3/1960 | Hensley et al. |
| 2,955,307 A | 10/1960 | Hunt |
| 3,007,186 A | 11/1961 | Olsson |
| 3,025,547 A | 3/1962 | Ciaccio |
| 3,048,870 A | 8/1962 | Criscuolo |
| 3,075,217 A | 1/1963 | Kollmann |
| 3,086,234 A | 4/1963 | Crane |
| 3,118,159 A | 1/1964 | Kollmann |
| 3,134,119 A | 5/1964 | Criscuolo |
| 3,149,480 A | 9/1964 | Hunt |
| 3,159,861 A | 12/1964 | Sarcone |
| 3,162,878 A | 12/1964 | Agostino |
| 3,206,782 A | 9/1965 | Larsen |
| 3,246,354 A | 4/1966 | Cooney et al. |
| 3,254,851 A | 6/1966 | Caperton |
| 3,283,353 A | 11/1966 | Kirk |
| 3,298,051 A | 1/1967 | Ratliff |
| 3,330,533 A | 7/1967 | Blume |
| 3,372,417 A | 3/1968 | Devine |
| 3,397,420 A | 8/1968 | Schneider |
| 3,414,926 A | 12/1968 | Bloom |
| 3,449,003 A | 6/1969 | Hunt |
| 3,451,089 A | 6/1969 | Carlson et al. |
| 3,451,090 A | 6/1969 | Presti et al. |
| 3,457,580 A | 7/1969 | Meyers |
| 3,469,273 A | 9/1969 | Caperton |
| 3,544,051 A | 12/1970 | Norman |
| 3,561,034 A | 2/1971 | Caperton |
| 3,605,158 A | 9/1971 | Russell |
| 3,691,583 A | 9/1972 | Silverman et al. |
| 3,706,110 A | 12/1972 | Siegal |
| 3,740,785 A | 6/1973 | Latall |
| 3,747,153 A | 7/1973 | O'Neill |
| 3,885,148 A | 3/1975 | Di Benedetto |
| 3,882,565 A | 5/1975 | Irwin et al. |
| 3,897,602 A | 8/1975 | Waterbury |
| 3,928,885 A | 12/1975 | Peterson et al. |
| 3,950,934 A | 4/1976 | Irwin |
| 3,958,293 A | 5/1976 | Irwin |
| 4,042,305 A | 8/1977 | Vincent |
| 4,069,534 A | 1/1978 | Martin |
| 4,104,757 A | 8/1978 | Silverman |
| 4,153,966 A | 5/1979 | Irwin |
| 4,188,683 A | 2/1980 | Klunder |
| 4,218,802 A | 8/1980 | Babb et al. |
| 4,244,072 A | 1/1981 | Dunham et al. |
| 4,280,852 A | 7/1981 | Dunham et al. |
| 4,284,931 A | 8/1981 | Ehret |
| 4,290,162 A | 9/1981 | Agostino |
| 4,292,704 A | 10/1981 | Joanis, Sr. |
| 4,356,557 A | 10/1982 | Bell et al. |
| 4,364,139 A | 12/1982 | Babb et al. |
| 4,395,791 A | 8/1983 | Irwin |
| 4,403,885 A | 9/1983 | Babb |
| 2,661,489 A | 12/1983 | Rudolph et al. |
| 4,420,852 A | 12/1983 | Bowlsby |
| 4,464,806 A | 8/1984 | Prange |
| 4,508,468 A | 4/1985 | Irwin |
| 4,540,017 A | 9/1985 | Prange |
| 4,566,551 A * | 1/1986 | Feliz ............... A61G 5/061 |
| | | 180/9.1 |
| 4,570,281 A | 2/1986 | Boelens |
| 4,580,306 A | 4/1986 | Irwin |
| 4,611,360 A | 9/1986 | Irwin |
| 4,644,603 A | 2/1987 | Meyer |
| 4,686,732 A | 8/1987 | Irwin |
| 4,692,957 A | 9/1987 | Kovacs |
| 4,700,422 A | 10/1987 | Russell |
| 4,716,613 A | 1/1988 | Irwin |
| 4,771,500 A | 9/1988 | Kovacs |
| 4,773,113 A | 9/1988 | Russell |
| 4,774,739 A | 10/1988 | Sherman, Jr. |
| 4,887,929 A | 12/1989 | Hale |
| 4,914,775 A | 4/1990 | Kirk |
| 4,916,772 A | 4/1990 | Russell et al. |
| 4,919,558 A | 4/1990 | Mascitelli et al. |
| 4,926,518 A | 5/1990 | Mikol |
| 4,943,182 A | 7/1990 | Hoblingre |
| 4,956,889 A | 9/1990 | Kirk |
| 5,009,242 A | 4/1991 | Prange |
| 5,029,356 A | 7/1991 | Silverman et al. |
| 5,031,263 A | 7/1991 | Babb et al. |
| 5,031,276 A | 7/1991 | Babb et al. |
| 5,056,176 A | 10/1991 | Belcher |
| 5,181,668 A | 1/1993 | Tsuji et al. |
| 5,182,833 A | 2/1993 | Yamaguchi et al. |
| 5,193,242 A | 3/1993 | Irwin |
| 5,199,129 A | 4/1993 | Salecker et al. |
| 5,222,270 A | 6/1993 | Sloter et al. |
| 5,226,207 A | 7/1993 | Elzaurdia |
| 5,230,116 A | 7/1993 | Rodriguez |
| 5,239,724 A | 8/1993 | Salecker et al. |
| 5,309,595 A | 5/1994 | Salecker et al. |
| 5,329,662 A | 7/1994 | Salecker |
| 5,335,388 A | 8/1994 | Salecker |
| 5,390,389 A | 2/1995 | Rutkowski et al. |
| 5,418,997 A | 5/1995 | DeFrange |
| 5,440,216 A | 8/1995 | Kim |
| 5,507,062 A | 4/1996 | Salecker |
| 5,526,975 A | 6/1996 | Endo |
| 5,535,473 A | 7/1996 | Maniar |
| 5,588,171 A | 12/1996 | Hamann |
| 5,618,123 A | 4/1997 | Pulse |
| 5,622,319 A | 4/1997 | Babb et al. |
| 5,636,648 A | 6/1997 | O'Brien et al. |
| 5,640,736 A | 6/1997 | Salecker |
| 5,657,505 A | 8/1997 | Gallagher et al. |
| 5,755,002 A | 5/1998 | Lacy |
| 5,768,741 A | 6/1998 | Leiman et al. |
| 5,862,561 A | 1/1999 | Irwin |
| 5,901,401 A | 5/1999 | Rutkowski et al. |
| 5,933,903 A | 8/1999 | Irwin |
| 5,987,683 A | 11/1999 | Leiman et al. |
| 5,996,159 A | 12/1999 | Irwin |
| 6,009,588 A | 1/2000 | Rutkowski |
| 6,040,660 A | 3/2000 | Schmidt et al. |
| 6,076,219 A | 6/2000 | Irwin |
| 6,158,076 A | 12/2000 | Rutkowski et al. |
| 6,243,905 B1 | 6/2001 | Rutkowski |
| 6,343,398 B1 | 2/2002 | Silverman et al. |

(56) References Cited

U.S. PATENT DOCUMENTS

| | | |
|---|---|---|
| 6,360,397 B1 | 3/2002 | Babb |
| 6,360,757 B1 | 3/2002 | Bohrer |
| 6,381,798 B1 | 5/2002 | Rutkowski et al. |
| 6,412,136 B1 | 7/2002 | Rutkowski |
| 6,421,871 B1 | 7/2002 | Peach et al. |
| 6,457,841 B1 | 10/2002 | Lynch et al. |
| 6,532,404 B2 | 3/2003 | Colens |
| 6,538,732 B1 | 3/2003 | Drost et al. |
| 6,546,582 B2 | 4/2003 | Silverman |
| 6,594,849 B1 | 7/2003 | Nimens |
| 6,615,436 B1 | 9/2003 | Burch, Jr. et al. |
| 6,615,440 B1 | 9/2003 | Williams |
| 6,618,892 B2 | 9/2003 | Schmitt |
| 6,637,064 B2 | 10/2003 | Silverman et al. |
| 6,655,228 B1 | 12/2003 | Marghrio et al. |
| 6,745,487 B1 | 6/2004 | Nield |
| 6,760,948 B2 | 7/2004 | Schmitt |
| 6,898,807 B2 | 5/2005 | Tash |
| 6,925,679 B2 | 8/2005 | Wallach et al. |
| 6,953,260 B1 | 10/2005 | Allen |
| 6,956,348 B2 | 10/2005 | Landry et al. |
| 7,007,399 B2 | 3/2006 | Catalano |
| 7,009,698 B2 | 3/2006 | Drost et al. |
| 7,052,554 B2 | 5/2006 | Rothenberger |
| 7,073,224 B2 | 7/2006 | Schmitt |
| 7,168,824 B2 | 1/2007 | Schnell |
| 7,186,002 B2 | 3/2007 | Matthews et al. |
| 7,191,673 B2 | 3/2007 | Thornhill et al. |
| 7,222,383 B2 | 5/2007 | Hale |
| 7,269,874 B2 | 9/2007 | Hung |
| 7,281,815 B1 | 10/2007 | Gustafson |
| 7,288,912 B2 | 10/2007 | Landry et al. |
| 7,344,270 B2 | 3/2008 | Kim |
| 7,367,077 B2 | 5/2008 | Rutkowski et al. |
| 7,373,689 B2 | 5/2008 | Bowden et al. |
| 7,402,961 B2 | 7/2008 | Bayat et al. |
| 7,459,871 B2 | 12/2008 | Landry et al. |
| 7,478,451 B2 | 1/2009 | Rutkowski et al. |
| 7,480,041 B2 | 1/2009 | Lindner |
| 7,549,766 B2 | 6/2009 | Sharrah et al. |
| D595,911 S | 7/2009 | Rutkowski et al. |
| 7,652,216 B2 | 1/2010 | Sharrah et al. |
| 7,674,003 B2 | 3/2010 | Sharrah et al. |
| 7,676,879 B1 | 3/2010 | Rutenberg et al. |
| 7,685,669 B2 | 3/2010 | Rutkowski et al. |
| 7,757,332 B1 | 7/2010 | Hale |
| 7,761,948 B2 | 7/2010 | Irwin |
| 7,765,626 B2 | 8/2010 | Sapia |
| 7,770,253 B2 | 8/2010 | Ha et al. |
| 7,810,203 B2 | 10/2010 | Stolz |
| 7,888,883 B2 | 2/2011 | Crawford et al. |
| 7,889,980 B2 | 2/2011 | Sooy |
| 7,891,038 B2 | 2/2011 | Hale |
| 7,935,192 B2 | 5/2011 | Silverman et al. |
| 8,046,862 B2 | 11/2011 | Eisermann et al. |
| 8,054,459 B2 | 11/2011 | Lindner |
| 8,060,968 B2 | 11/2011 | Babb et al. |
| 8,091,333 B2 | 1/2012 | Lee |
| 8,176,593 B2 | 5/2012 | Gress et al. |
| 8,253,368 B2 | 8/2012 | Landry et al. |
| 8,261,397 B2 | 9/2012 | Lee |
| 8,365,337 B2 | 2/2013 | Tash |
| 8,378,613 B2 | 2/2013 | Landry et al. |
| 8,386,081 B2 | 2/2013 | Landry et al. |
| 8,413,347 B2 | 4/2013 | Gress et al. |
| 8,428,778 B2 | 4/2013 | Landry et al. |
| 8,434,186 B2 | 5/2013 | Wildauer et al. |
| RE44,281 E | 6/2013 | Snyder |
| 8,456,125 B2 | 6/2013 | Landry et al. |
| 8,458,845 B1 | 6/2013 | Tabieros |
| 8,505,146 B1 | 8/2013 | Jessup |
| 8,510,891 B2 | 8/2013 | Fivecoate |
| 8,529,086 B2 | 9/2013 | Skrivan et al. |
| 8,553,340 B2 | 10/2013 | Drost et al. |
| 8,584,297 B2 | 11/2013 | Tash |
| 8,594,840 B1 | 11/2013 | Chiappetta et al. |
| 8,598,829 B2 | 12/2013 | Landry et al. |
| 8,615,837 B2 | 12/2013 | Hale et al. |
| 8,646,143 B2 | 2/2014 | Lokkinen |
| 8,781,626 B2 | 7/2014 | Landry et al. |
| 8,817,252 B2 | 8/2014 | Lindner |
| 8,826,483 B2 | 9/2014 | Rutkowski et al. |
| 8,838,268 B2 | 9/2014 | Friedman et al. |
| 8,871,030 B2 | 10/2014 | Chen et al. |
| 8,931,131 B1 | 1/2015 | Feduke |
| 8,931,973 B2 | 1/2015 | Olszewski |
| 8,970,211 B1 | 3/2015 | Olsson et al. |
| 8,984,698 B1 | 3/2015 | Olsson |
| 9,009,906 B2 | 4/2015 | Hale et al. |
| 9,015,889 B1 | 4/2015 | Khonsary |
| 9,015,890 B1 | 4/2015 | Owens |
| 9,018,848 B2 | 4/2015 | Garcia |
| 9,041,794 B1 | 5/2015 | Olsson et al. |
| 9,055,848 B2 | 6/2015 | Liu et al. |
| 9,060,407 B2 | 6/2015 | West |
| 9,080,599 B2 | 7/2015 | Rutkowski et al. |
| 9,144,138 B2 | 9/2015 | Xie |
| 9,144,361 B2 | 9/2015 | Landry et al. |
| 9,173,539 B2 | 11/2015 | Yoon et al. |
| 9,194,114 B2 | 11/2015 | Petry |
| 9,217,245 B2 | 12/2015 | Yu |
| 9,234,342 B1 | 1/2016 | Beesley et al. |
| 9,260,847 B2 | 2/2016 | Silverman et al. |
| 9,346,085 B2 | 5/2016 | Khani Moghanaki |
| 9,402,524 B2 | 8/2016 | Yoon et al. |
| 9,414,731 B2 | 8/2016 | Soejima |
| 9,456,182 B2 | 9/2016 | Stenson |
| 9,526,390 B2 | 12/2016 | Yi et al. |
| 9,533,856 B2 | 1/2017 | Spelich et al. |
| 9,670,656 B2 | 6/2017 | Rutkowski et al. |
| 9,723,962 B2 | 8/2017 | Yoon et al. |
| 9,733,549 B2 | 8/2017 | Drost et al. |
| 10,479,385 B2 * | 11/2019 | Collibault ............... B62D 55/02 |
| 2001/0038786 A1 | 11/2001 | Kim |
| 2003/0182754 A1 | 10/2003 | O'Brian |
| 2003/0231927 A1 | 12/2003 | Hale |
| 2004/0204792 A1 | 10/2004 | Taylor et al. |
| 2004/0255415 A1 | 12/2004 | Silva |
| 2005/0028307 A1 | 2/2005 | Wu |
| 2005/0166355 A1 | 8/2005 | Tani |
| 2005/0183229 A1 | 8/2005 | Uehigashi |
| 2006/0130646 A1 | 6/2006 | Sep et al. |
| 2006/0193129 A1 | 8/2006 | Opolka |
| 2007/0033752 A1 | 2/2007 | Hung |
| 2008/0098544 A1 | 5/2008 | Rutkowski et al. |
| 2008/0148503 A1 | 6/2008 | Babb et al. |
| 2008/0229527 A1 | 9/2008 | Berry |
| 2008/0244816 A1 | 10/2008 | Babb et al. |
| 2009/0083915 A1 | 4/2009 | Cicchelli et al. |
| 2009/0208282 A1 | 8/2009 | Hale |
| 2009/0300863 A1 | 12/2009 | Bartucciotto |
| 2010/0017981 A1 | 1/2010 | Hamm et al. |
| 2010/0053942 A1 | 3/2010 | Tarter et al. |
| 2010/0132143 A1 | 6/2010 | Flamand |
| 2010/0293742 A1 | 11/2010 | Chung et al. |
| 2011/0035883 A1 | 2/2011 | Vogel et al. |
| 2011/0182656 A1 | 7/2011 | Babb |
| 2011/0242799 A1 | 10/2011 | Dyer |
| 2012/0110761 A1 | 5/2012 | Ripperger et al. |
| 2012/0140457 A1 | 6/2012 | McQuade |
| 2012/0300057 A1 | 11/2012 | Bartucciotto |
| 2013/0192907 A1 | 8/2013 | Sarokham et al. |
| 2014/0115802 A1 | 5/2014 | Yu |
| 2014/0247338 A1 | 9/2014 | Kessler |
| 2014/0268682 A1 | 9/2014 | Brady |
| 2014/0271095 A1 | 9/2014 | Umans et al. |
| 2014/0289917 A1 | 10/2014 | Landy et al. |
| 2015/0104241 A1 | 4/2015 | Spelich et al. |
| 2015/0176637 A1 | 6/2015 | Dunkin et al. |
| 2015/0185322 A1 | 7/2015 | Haegermarck |
| 2015/0250299 A1 | 9/2015 | Danzeisen |
| 2015/0329380 A1 | 11/2015 | Zhu et al. |
| 2016/0175899 A1 | 6/2016 | Dunkin et al. |
| 2016/0219205 A1 | 7/2016 | Kessler |

(56) References Cited

U.S. PATENT DOCUMENTS

| | | |
|---|---|---|
| 2017/0191646 A1 | 7/2017 | Marie et al. |
| 2017/0268315 A1 | 9/2017 | Reyes et al. |
| 2019/0210078 A1 | 7/2019 | Davies et al. |

FOREIGN PATENT DOCUMENTS

| | | |
|---|---|---|
| CN | 202516816 | 11/2012 |
| CN | 202577502 | 12/2012 |
| CN | 206247092 | 6/2017 |
| CN | 206310294 | 7/2017 |
| DE | 1942086 | 7/1966 |
| DE | 2244206 | 3/1974 |
| DE | 3423464 | 1/1986 |
| DE | 20111229 | 10/2001 |
| DE | 10248411 | 4/2004 |
| DE | 102012109648 | 4/2014 |
| EP | 1375763 | 1/2004 |
| EP | 1930649 | 6/2008 |
| EP | 2502681 | 9/2012 |
| GB | 1118126 | 6/1968 |
| GB | 214944 | 1/1985 |
| GB | 2142944 A | 1/1985 |
| WO | 2001077575 | 10/2001 |
| WO | 2006080918 | 8/2006 |
| WO | 2006112847 | 10/2006 |
| WO | 2006112848 | 10/2006 |
| WO | 2010053374 | 5/2010 |
| WO | 2011036691 | 3/2011 |

OTHER PUBLICATIONS

Wesco Industrial Products Inc, "Stairking Replacement Parts List", Issued Oct. 5, 2006.

Global Industrial, "Wesco Stairking Battery Powered Stair Climbing Appliance Hand Truck 230051 66"H", <https://www.globalindustrial.com/p/material-handling/hand-trucks-dollies/hand-trucks-appliance-stair-climbing/battery-powered-stair-climbing-appliance-hand-truck-66-h-850-lb-capacity>, webpage publicly available at least as early as Nov. 11, 2017.

Handtrucks2go, "Escalera Staircat Powered Stair Climber Hand Truck", <https://handtrucks2go.com/Escalera-Electric-Stair-Climber.html>, webpage publicly available at least as early as Apr. 14, 2011.

Global Industrial, "Industrial Strength Steel Hand Truck with Curved Handle & Stair Climbers 600 Lb. Capacity", <https://www.globalindustrial.com/p/material-handling/hand-trucks-dollies/hand-trucks-steel/industrial-strength-steel-hand-truck-curved-handle-with-stair-climbers>, web page publicly available at least as early as Mar. 25, 2010.

\* cited by examiner

TOOL SUPPORT

CROSS REFERENCE TO RELATED APPLICATIONS

This application claims priority to U.S. Provisional Patent Application No. 62/657,076, filed Apr. 13, 2018, the entire contents of which are incorporated by reference herein.

BACKGROUND

The present invention relates powered tracks and, more particularly, to powered tracks for tools.

Many tools required for job sites are heavy and bulky, requiring the assistance of multiple users to transport the tools. For example, tools may need to be lifted in and out of truck beds when users travel back and forth between job sites. Due to the heavy and bulky nature of the tools, many times the tools are dropped or mishandled when being transported, causing damage to the tools. Additionally, moving these tools up and down stairs is a difficult task.

SUMMARY

In one embodiment, the invention provides a tool support including a frame that is configured to support a tool and a powered track supported on the frame. The powered track includes a drive roller, an idler roller, and an endless belt that extends around the drive roller and the idler roller. The tool support also includes a first motor supported on the frame. The first motor is operable to drive the drive roller and rotate the endless belt. The tool support further includes a second motor supported by the frame. The second motor is configured to be coupled to the tool to drive the tool supported on the frame.

In another embodiment, the invention provides a tool support including a frame configured to support a tool and a powered track supported on the frame. The powered track includes a drive roller, an idler roller, and an endless belt that extends around the drive roller and the idler roller. The powered track also includes a power supply supported on the frame. The power supply is operable to power the powered track and the tool supported on the frame.

In another embodiment, the invention provides a tool support including a frame configured to support a tool and a powered track supported on the frame. The powered track includes a drive roller, an idler roller, and an endless belt that extends around the drive roller and the idler roller. The powered track is pivotable relative to the frame between a first position and a second position. The tool support also includes a motor supported by the frame. The motor is operable to drive the drive roller and rotate the powered track. The powered tracks also include a power supply supported by the frame. The power supply is operable to power the motor.

In another embodiment, the invention provides a tool support system including a tool, a frame supporting the tool, and a powered track supported on the frame. The powered track includes a drive roller, an idler roller, and an endless belt that extends around the drive roller and the idler roller. The tool support system also includes a first motor that is operable to drive the drive roller and rotate the endless belt. The tool support further includes a second motor supported by the frame that is operable to drive the tool supported on the frame. The tool support also includes a power supply supported by the frame and operable to power the first and second motors.

Other aspects of the present subject matter will become apparent by consideration of the detailed description and accompanying drawings.

Before any embodiments are explained in detail, it is to be understood that the present subject matter is not limited in its application to the details of construction and the arrangement of components set forth in the following description or illustrated in the following drawings. The present subject matter is capable of other embodiments and of being practiced or of being carried out in various ways.

DETAILED DESCRIPTION

Figure 1:
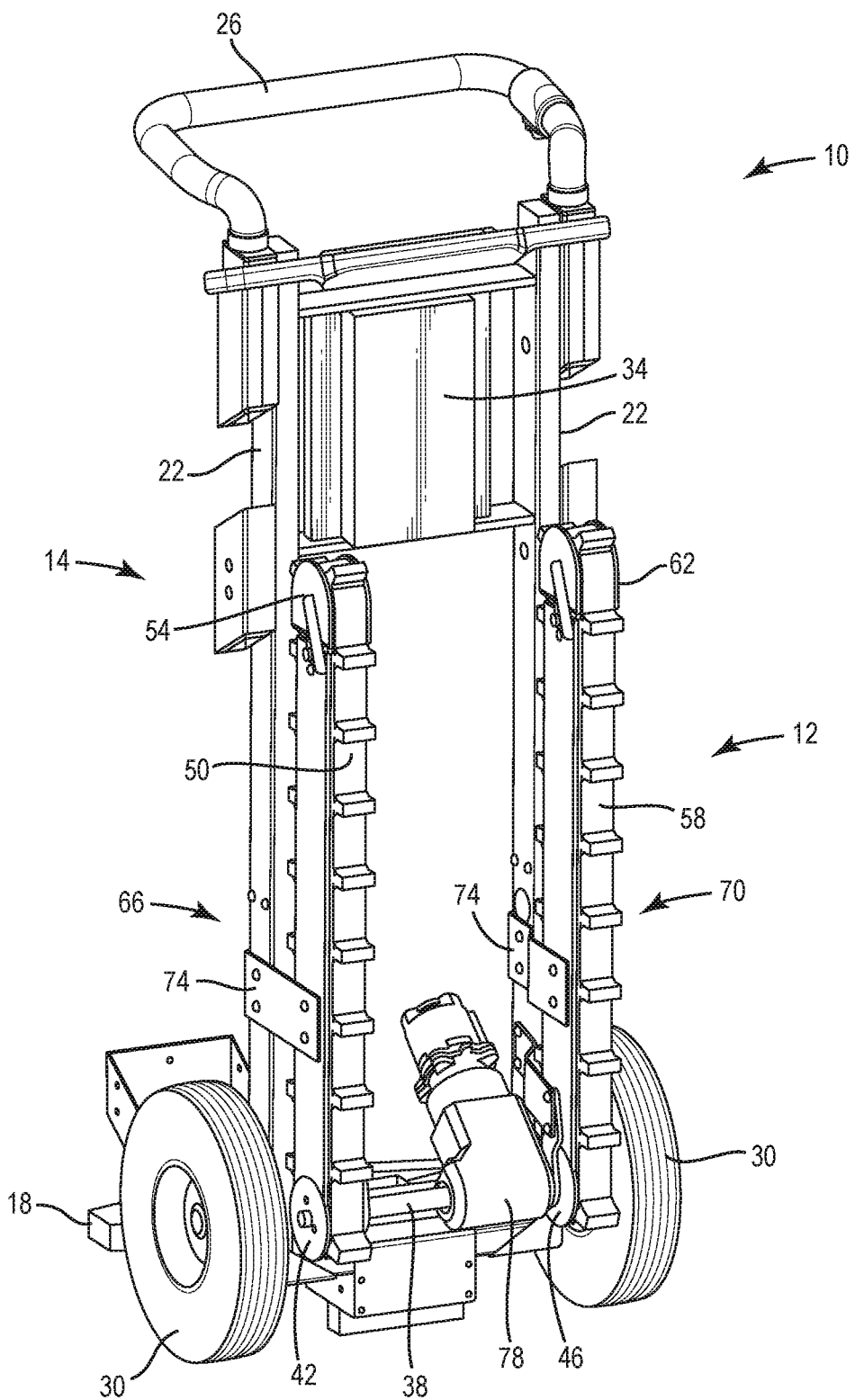
FIG. 1 is a perspective view of a tool support including powered tracks.
Figure 2:
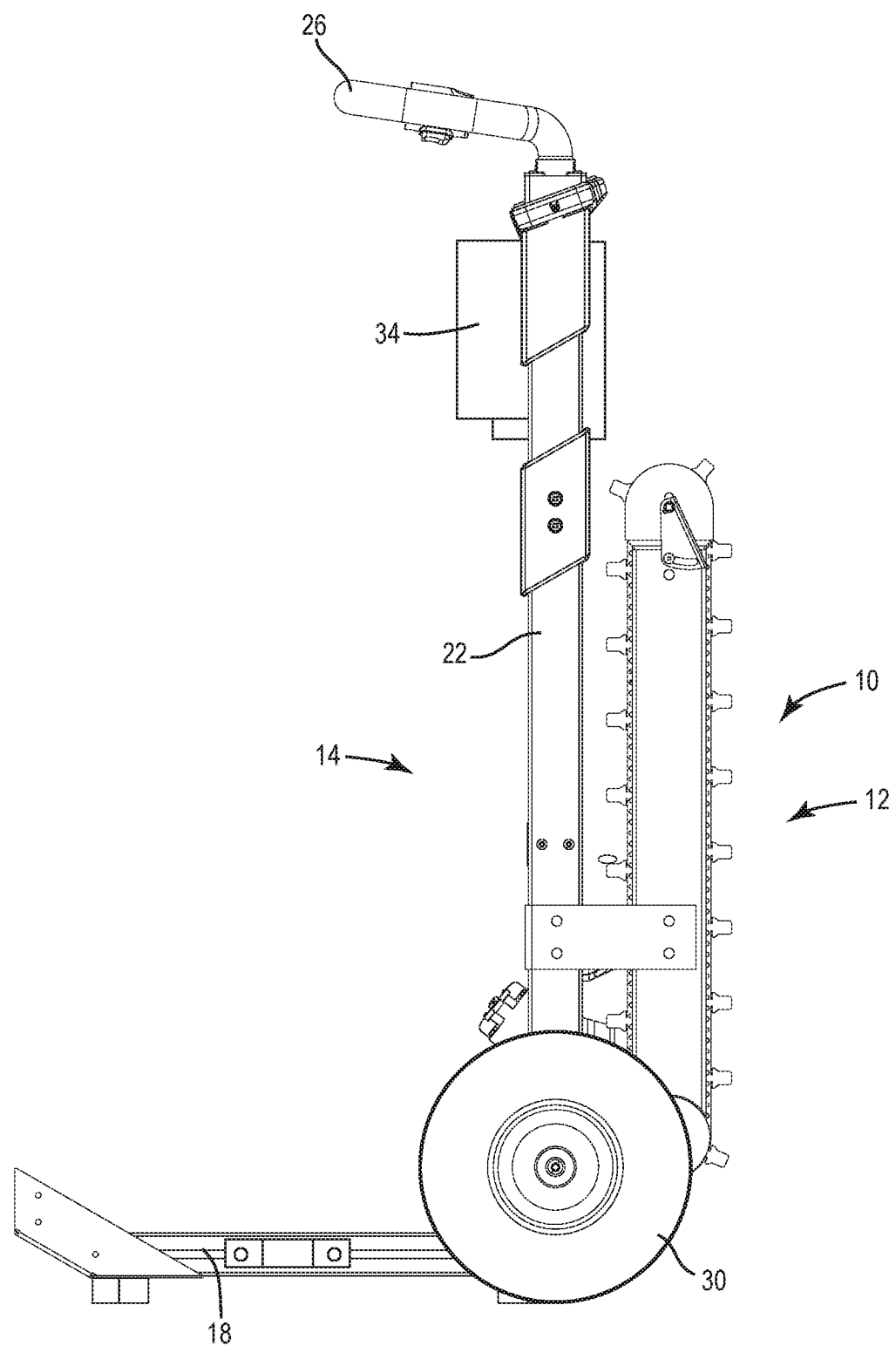
FIG. 2 is a side view of the tool support of FIG. 1.
Figure 3:
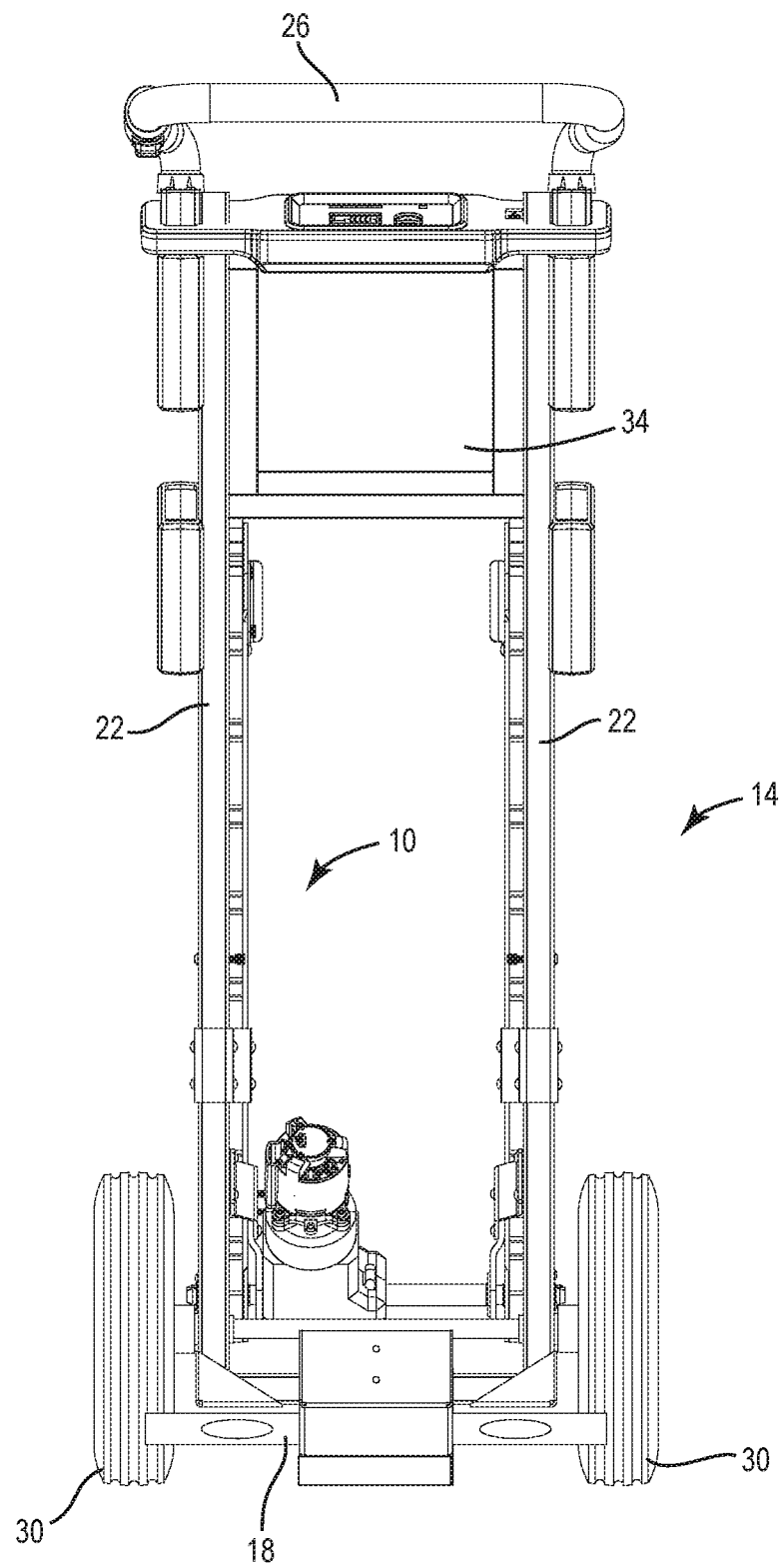
FIG. 3 is a front view of the tool support of FIG. 1.

FIGS. 1-3 illustrate a tool support 10 that may be coupled to a variety of tools such as sewer cleaning machines, storage device systems, tool boxes, power tools, generators, site lights, and the like. The tool support 10 is capable of assisting tools to move over relatively smooth ground as well as up and down inclines, such as stairs. Further, the tool support 10 is capable of moving tools up elevations, such as in and out of truck beds. In the illustrated embodiment, the tool support 10 includes powered tracks 12 supported on a frame, such as a dolly 14. The dolly 14 is configured to support a tool. In other embodiments, the powered tracks 12 may be directly coupled to a tool. The illustrated dolly 14 includes a base 18 that supports the tool, two vertical supports 22, a handle 26 extending between the two vertical supports 22, and wheels 30. In some embodiments, the handle 26 may include operator controls for the tool support 10 or for the tool that the dolly 14 is supporting. The dolly 14 further supports a power supply 34 that is electrically coupled to the tool support 10 to provide power to the tool support 10. In some embodiments, the power supply 34 may be supported directly on the powered tracks 12. In other embodiments, the powered tracks 12 may be electrically coupled to a power supply of the tool supported by the tool support 10.

With reference to FIG. 1, the powered tracks 12 include a substantially horizontal drive shaft 38 with a first drive roller 42 at one end and a second drive roller 46 at another end. A first endless belt 50 extends around the first drive roller 42 and a first idler roller 54. A second endless belt 58 extends around the second drive roller 46 and a second idler roller 62. The first drive roller 42, the first idler roller 54, and the first endless belt 50 define a first track 66 of the powered tracks 12. Similarly, the second drive roller 46, the second idler roller 62, and the second endless belt 58 define a second track 70 of the powered tracks 12. The first and second endless belts 50, 58 extend substantially vertically along a length of the vertical supports 22. In some embodiments, the endless belts 50, 58 include traction features that assist in gripping a surface, ledge, or other object. Brackets 74 couple the first and second tracks 66, 70 to the vertical supports 22 of the dolly 14. As described in more detail below, in some embodiments, the first and second tracks 66, 70 are pivotably coupled to the dolly 14 to allow the powered tracks 12 to be angled relative to the dolly 14. In other embodiments, the brackets 74 may directly couple the tracks 66, 70 to a tool. In some embodiments, each track 66, 70 may include multiple idler rollers. In such embodiments, the idler rollers may be positioned to change the overall shape of the tracks (e.g., linear, triangular, rectangular, etc.). Additionally or alternatively, the idler rollers may be adjustable (e.g., movable) relative to each other and/or the drive rollers 42, 46 to change a shape or angle of the belts 50, 58 for different uses.

With continued reference to FIG. 1, a motor 78 is coupled to the drive shaft 38 of the powered tracks 12. The motor 78 is operable to rotate the drive shaft 38 and, thus, the first and second drive rollers 42, 46 to rotate the first and second endless belts 50, 58. In the illustrated embodiment, the motor 78 is powered by the power supply 34 that is supported on the dolly 14. In some embodiments, the power supply 34 may be coupled to a power outlet to provide A/C power to the powered tracks 12 and the associated tool. In other embodiments, the power supply 34 may include a battery receptacle that receives a battery pack to provide D/C power to the powered tracks 12 and the associated tool. In some embodiments, the battery pack may be a power tool battery pack, such as, for example, an 18V Li-ion battery. In other embodiments, the battery pack may have other voltages (e.g., 12V, 28V, etc.) and/or chemistries (e.g., NiCD, etc.). In further embodiments, the power supply 34 may receive more than one battery pack to power the powered tracks 12 and tool. Alternatively, the power supply 34 may be a dedicated power supply for the powered tracks 12 only and may not provide power to the associated tool. Although not shown, the power supply 34 includes a controller that may control operation of the powered tracks 12. Additionally, the power supply 34 may include switches, buttons, a user interface, or other control features that allow a user to selectively control the power supply 34.

Figure 4:
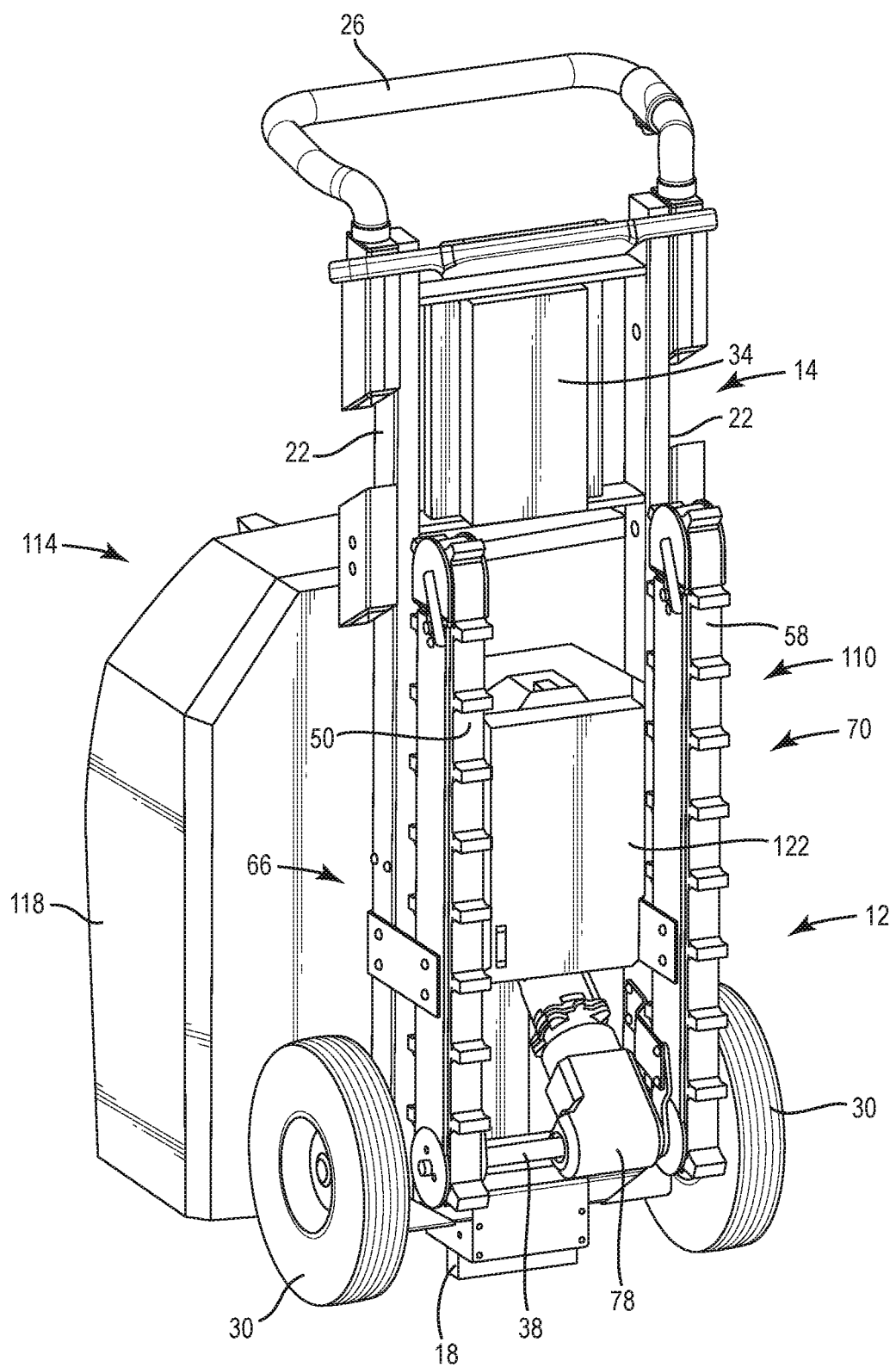
FIG. 4 is a perspective view of the tool support of FIG. 1 supporting a sewer cleaning machine.
Figure 5:
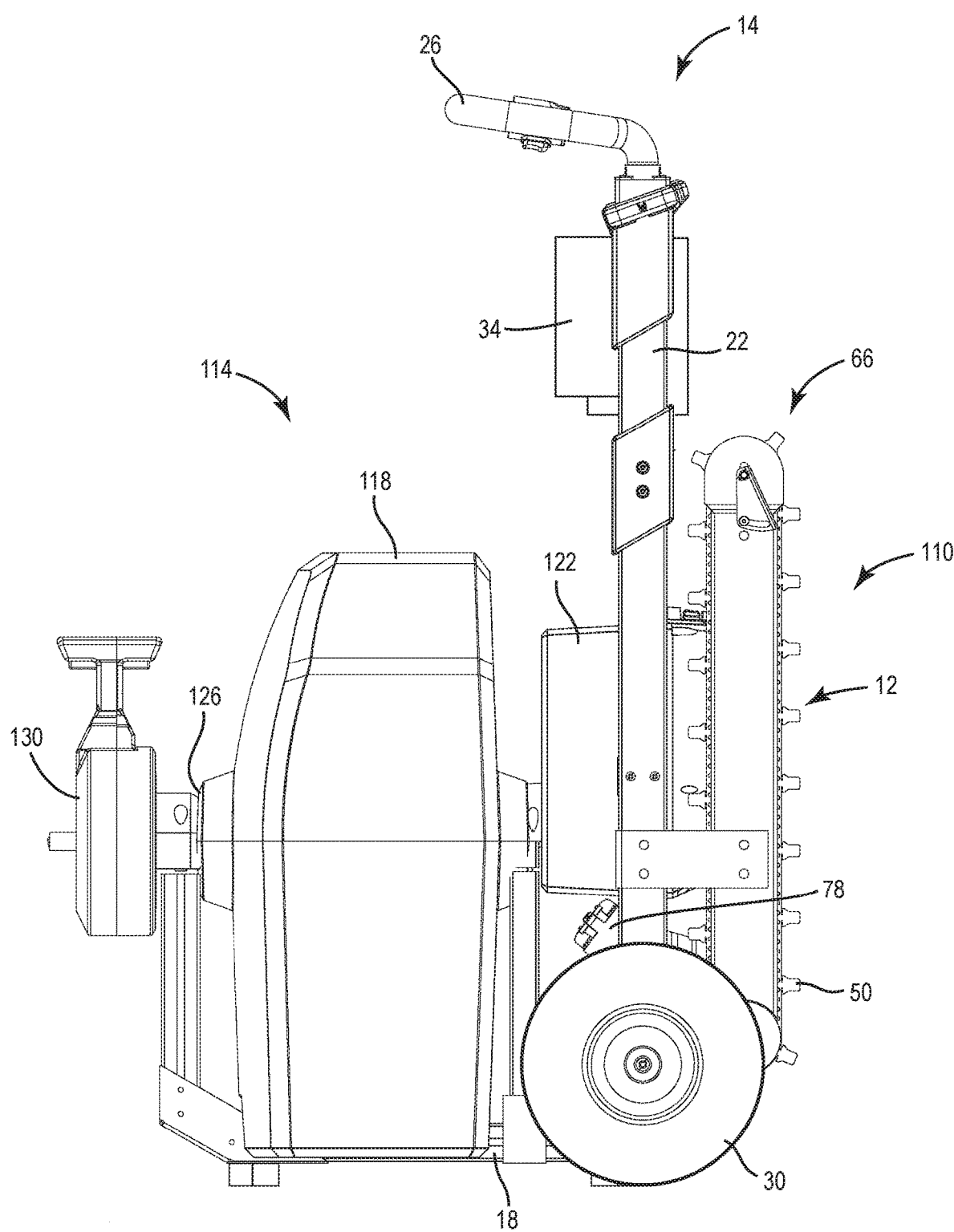
FIG. 5 is a side view of the tool support and the sewer cleaning machine of FIG. 4.

FIGS. 4-5 illustrate another embodiment of a tool support 110. The tool support 110 is similar to the tool support 10 described above, with like features being represented with like reference numerals. In the illustrated embodiment, the tool support 10 and the dolly 14 are supporting a sewer cleaning machine 114 including a drum housing 118 and a motor housing 122. The drum housing 118 is supported on the base 18 of the dolly 14, and the motor housing 122 is supported by the two vertical supports 22. A drum is rotatably supported within the drum housing and includes a cable that is extendable out of an opening 126 (FIG. 5). The cable is extendable out of the drum with a cable drive device 130 (FIG. 5). A motor is supported within the motor housing 122 and is coupled to the drum. The motor is operable to rotate the drum. Rotation of the drum creates friction between an inner surface of the drum and the cable, which causes the cable to spin to facilitate clearing debris from a drain pipe or another conduit.

The tool support 110 is capable of transporting the sewer cleaning machine 114 along relatively flat surfaces. To transport the sewer cleaning machine 114, a user may rotate the sewer cleaning machine 114 ninety degrees clockwise relative to FIG. 5 to position the first and second tracks 66, 70 on a surface. The motor 78 will then rotate the drive shaft 38 and move the first and second endless belts 50, 58 to move the sewer cleaning machine 114 along the surface.

A user may also tilt the frame or dolly 14, lifting the drum housing 118 off of a surface and allowing the wheels 30 to transport the sewer cleaning machine 114 along the surface. However, due to the weight, the sewer cleaning machine 114 may be difficult to lift. Specifically, a user may have difficulty transporting the sewer cleaning machine 114 on stairs. During transportation, the tool support 110 may assist in lifting the sewer cleaning machine 114 both up and down stairs. A user may first position the sewer cleaning machine 114 so that the tool support 110 and the powered tracks 12 engage the stairs. Once the powered tracks 12 engage the stairs, the user can control the power supply 34 to operate the motor 78. The motor 78 rotates the drive shaft 38 rotating the first and second endless belts 50, 58. As the first and second endless belts 50, 58 rotate, the traction on the endless belts 50, 58 assist in pulling the sewer cleaning machine 114 up the stairs. Meanwhile, the user can also assist by pulling on the handle 26 of the dolly 14. To transport the sewer cleaning machine 114 down stairs, a user can control the motor 78 to rotate the first and second tracks 66, 70 in the opposite direction. The same operation described above may also be used to transport the sewer cleaning machine 114 up taller ledges, such as an edge of a truck bed.

Figure 6:
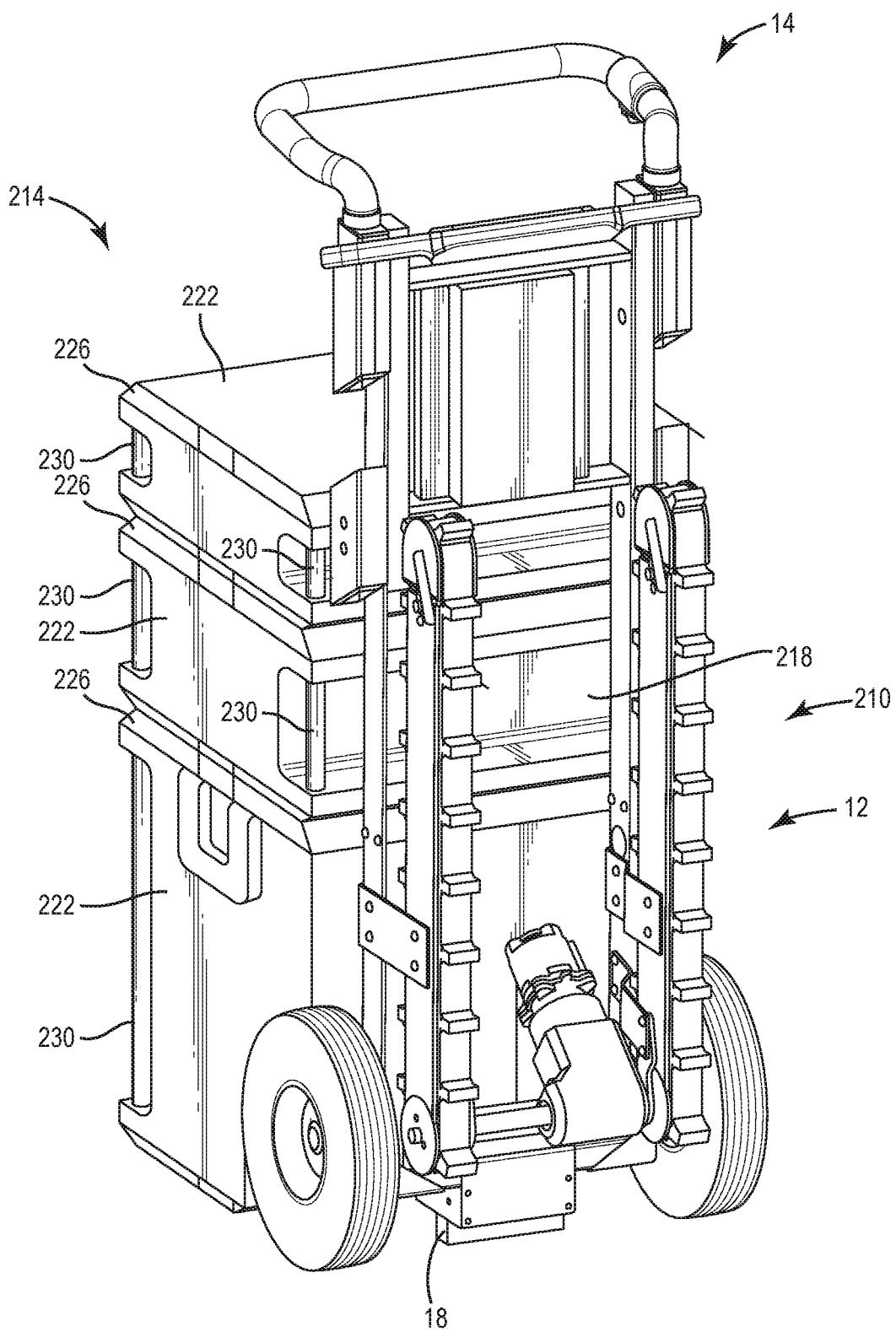
FIG. 6 is a perspective view of the tool support of FIG. 1 supporting a storage device system.

FIG. 6 illustrates another embodiment of a tool support 210. The tool support 210 is similar to the tool support 10 described above, with like features being represented with like reference numerals. In the illustrated embodiment, the powered tracks 12 and the dolly 14 are coupled to a storage device system 214. In other embodiments, the powered tracks 12 are directly coupled to a back side 218 of the storage device system 214 and do not include the dolly 14. The illustrated storage device system 214 includes three storage boxes 222. In the illustrated embodiment, the storage boxes 222 are different sizes, although in further embodiments the storage boxes 222 may be similar sizes. The storage boxes 222 are vertically stacked on another and are secured to one another. In other words, the bottom of one storage box 222 corresponds to the top of another storage box 222 to keep the storage boxes 222 as a single unit. In the illustrated embodiment, the storage boxes 222 are made out of plastic. In other embodiments, the storage boxes 222 may be made from other materials.

The storage boxes 222 each include a lid 226 that, when opened, allows access to an interior that is capable of holding tools. The interiors may also have organizers to help organize the tools. The storage boxes 222 further include rails 230 that additional organizers can be tied to for additional tool storage. The rails 230 may also be used for grasping and moving the storage boxes 222 apart from the dolly 14.

The tool support 210 is capable of transporting the storage device system 214 in a similar way as described above with reference to the tool support 110 coupled to the sewer cleaning machine 114. As such, the tool support 210 may transport the storage device system 214 over a relatively flat surface, up and down stairs, and onto higher ledges.

Figure 7:
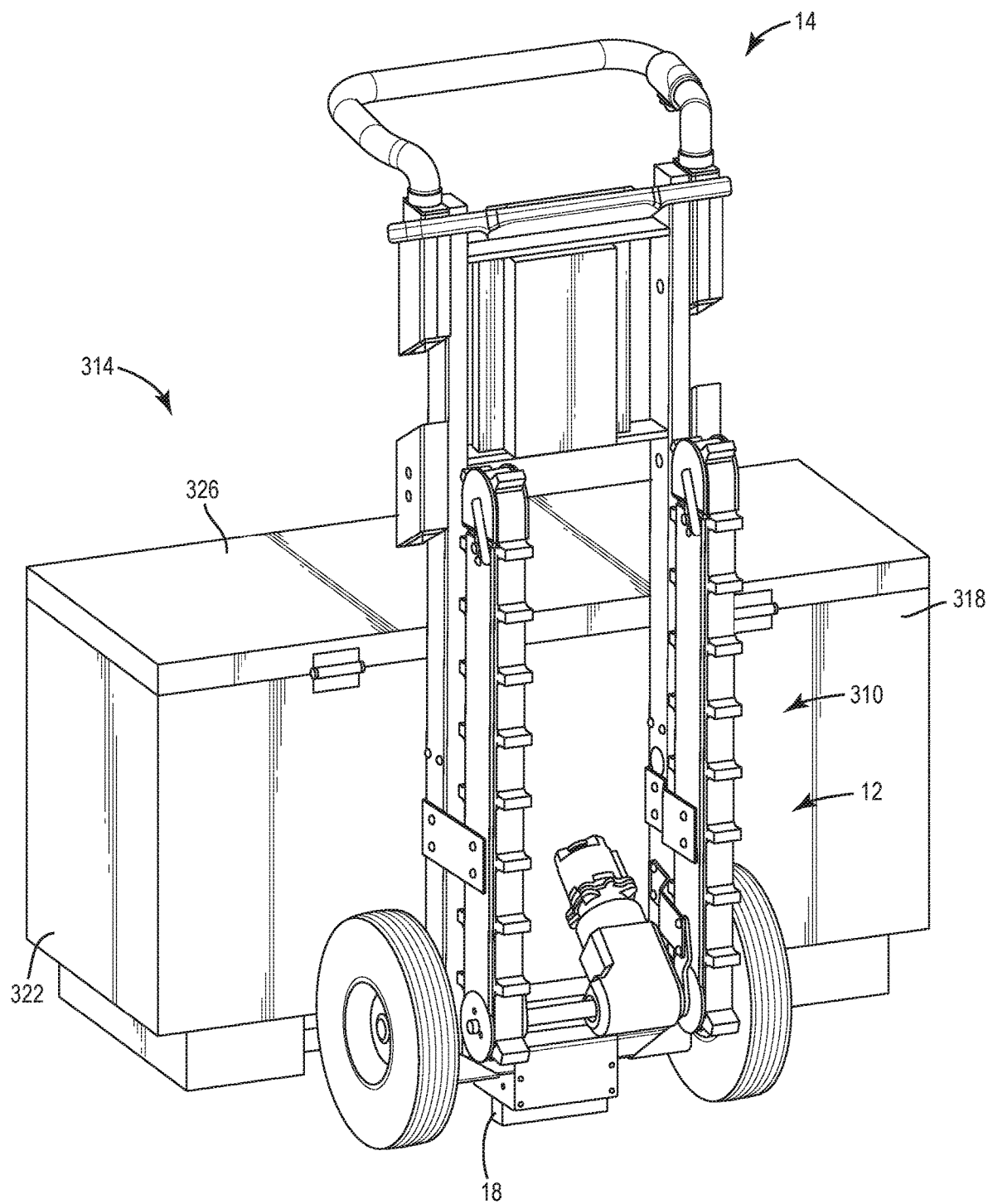
FIG. 7 is a perspective view of the tool support of FIG. 1 supporting a job box.

FIG. 7 illustrates another embodiment of a tool support 310. The tool support 310 is similar to the tool support 10 described above, with like features being represented with like reference numerals. In the illustrated embodiment, the powered tracks 12 and the dolly 14 are coupled to a job box 314. In other embodiments, the powered tracks 12 are directly coupled to a back side 318 of the job box 314 and do not include the dolly 14. The job box 314 includes a base 322 and a lid 326. The base 322 is supported by the base 18 of the dolly 14 and defines a storage area for receiving and storing items, such as tools and accessories at a jobsite. The lid 326 is pivotally coupled to the base 322 for movement between an open position and a closed position. The job box 314 may include accessories, such as shelf lights or organizers. In the illustrated embodiment, the job box 314 is made out of metal, such as steel. In other embodiments, the job box 314 may be made out of other materials.

The tool support 310 is capable of transporting the job box 314 in a similar way as described above with reference to the tool support 110 coupled to the sewer cleaning machine 114. As such, the tool support 310 may transport the job box 314 over a relatively flat surface, up and down stairs, and onto higher ledges.

Figure 8:
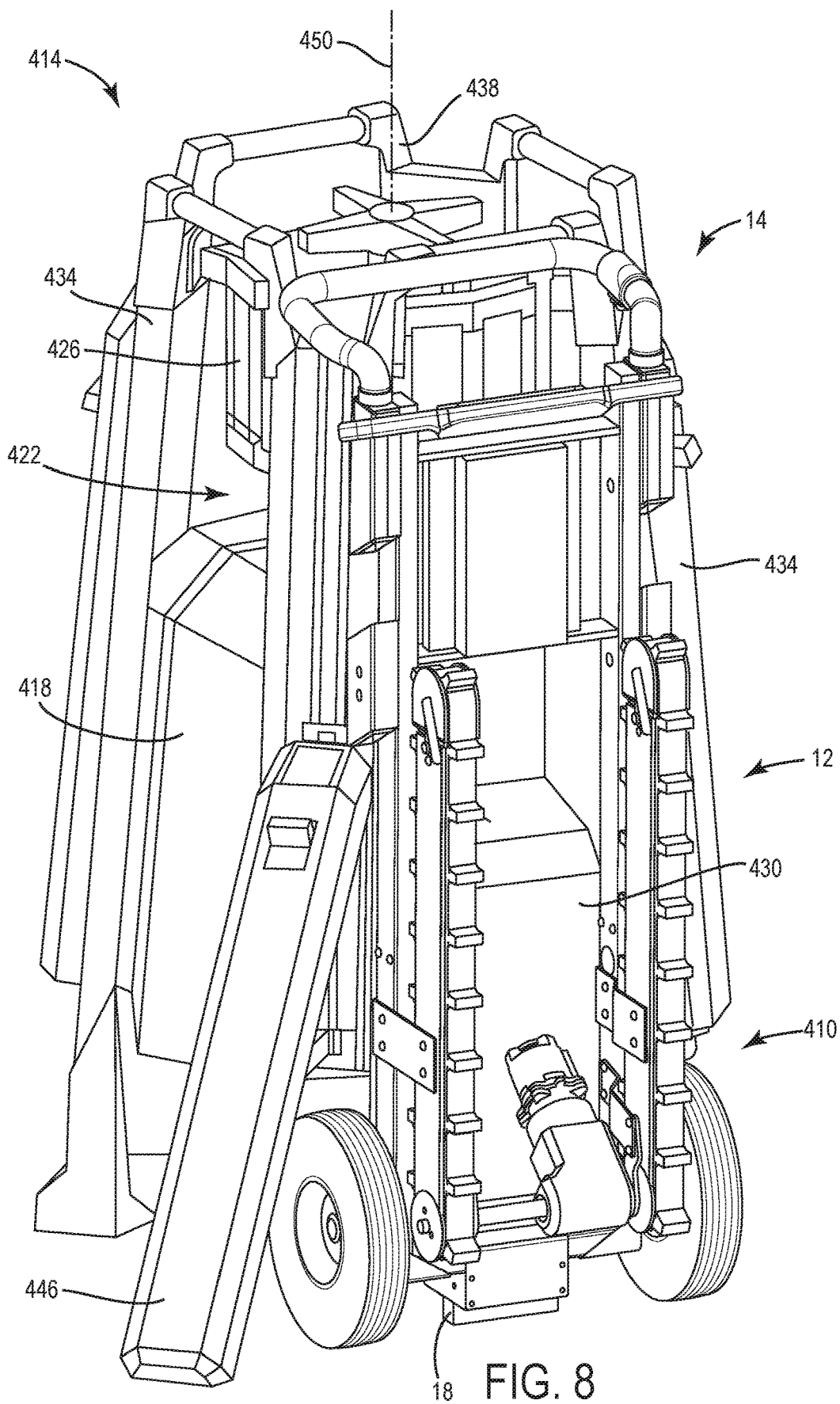
FIG. 8 is a perspective view of the tool support of FIG. 1 supporting a site light.

FIG. 8 illustrates another embodiment of a tool support 410. The tool support 410 is similar to the tool support 10 described above, with like features being represented with like reference numerals. In the illustrated embodiment, the powered tracks 12 and dolly 14 are coupled to a site light 414. In other embodiments, the powered tracks 12 may be directly coupled to the site light 414 and do not include the dolly 14. The site light 414 is a mobile site light for illuminating a jobsite, such as a construction site, or other large area. The site light 414 includes a body 418, a telescopic arm assembly 422 supported by the body 418, and a light assembly 426 coupled to the telescopic arm assembly 422 and movable relative to the body 418. The telescopic arm assembly 422 is extendable and retractable relative to the body 418 to raise and lower the light assembly 426. The site light 414 also includes a power system to provide electrical power to the light assembly and a cooling system to regulate the temperature of the power system and the other components of the site light 414.

The body 418 of the site light 414 includes a base 430 that is supported by the base 18 of the dolly 14, a plurality of channels 434 coupled to the base, a handle assembly 438 coupled to the channels 434 opposite the base 430, and a housing 442 supported by the channels 434. As shown in FIG. 8, the body 418 also includes one or more leg assemblies 446 coupled thereto and configured to provide additional stability and support for the body 418 during use. For example, the leg assemblies 446 may move (e.g., pivot and slide) outward from the body 418 to a deployed position, creating outriggers that contact the ground. One of the legs assemblies 446 is shown in this deployed position in FIG. 8. The dolly 14 and the powered tracks 12 are positioned between two adjacent leg assemblies 446 so that the tool support 410 does not interfere with movement of the leg assemblies 446. The body 418 also defines an axis 450 extending therethrough. For operation, the body 418 of the site light 414 is generally placed in an "upright orientation" whereby the axis 450 is maintained in a substantially vertical orientation.

The tool support 410 is capable of transporting the site light 414 in a similar way as described above with reference to the tool support 110 coupled to the sewer cleaning machine 114. As such, the tool support 410 may transport the site light 414 over a relatively flat surface, up and down stairs, and onto higher ledges.

Figure 9:
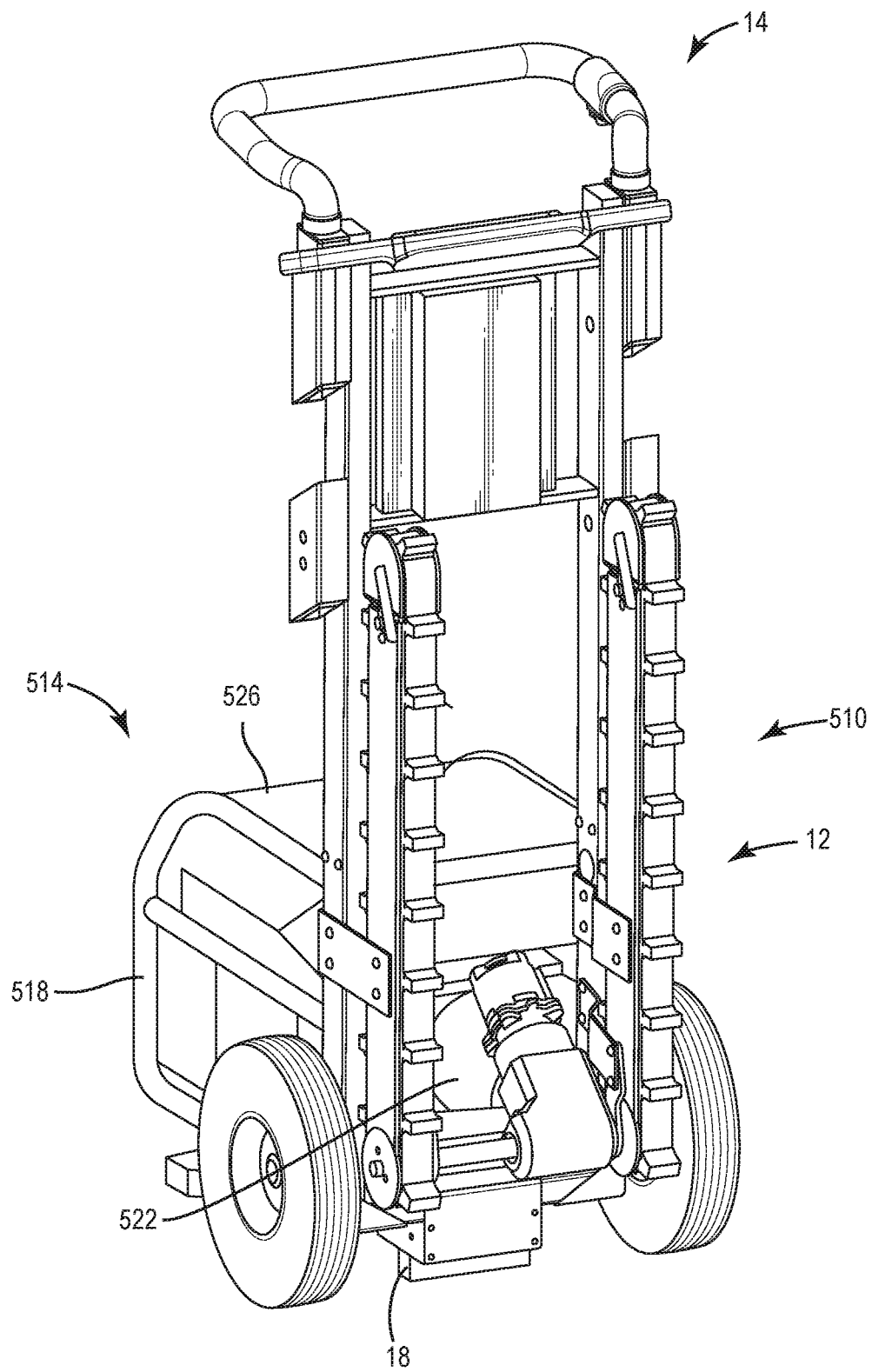
FIG. 9 is a perspective view of the tool support of FIG. 1 supporting a generator.

FIG. 9 illustrates another embodiment of a tool support 510. The tool support 510 is similar to the tool support 10 described above, with like features being represented with like reference numerals. In the illustrated embodiment, the powered tracks 12 and the dolly 14 are coupled to a generator 514. In other embodiments, the powered tracks 12 may be directly coupled to the generator 514 and may not include the dolly 14. The generator 514 is a mobile generator for providing electrical power to a jobsite, such as a construction site. The generator 514 includes a frame 518, an engine 522 supported by the frame 518, and a control panel 526. The frame 518 of the generator 514 is supported on the base 18 of the dolly 14. The frame 518 may be removably coupled to the dolly 14 or fixed to the dolly 14. The engine 522 is powered by gasoline and converts mechanical energy into electrical energy. The control panel 526 includes electrical outlets that provide electrical power to A/C powered tools.

The tool support 510 is capable of transporting the generator 514 in a similar way as described above with reference to the tool support 110 coupled to the sewer cleaning machine 114. As such, the tool support 510 may transport the generator 514 over a relatively flat surface, up and down stairs, and onto higher ledges.

Figure 10:
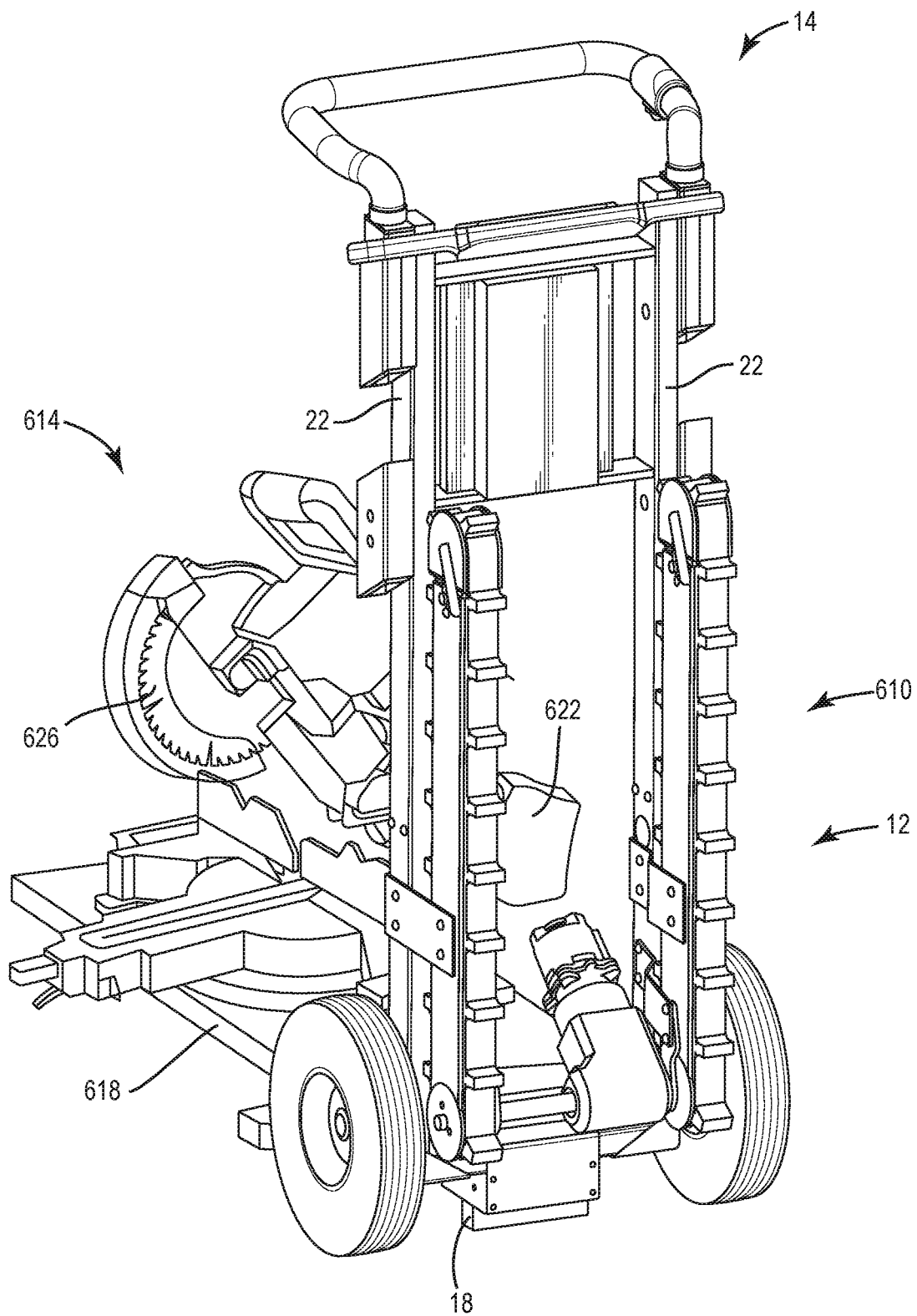
FIG. 10 is a perspective view of the tool support of FIG. 1 supporting a table saw.

FIG. 10 illustrates another embodiment of a tool support 610. The tool support 610 is similar to the tool support 10 described above, with like features being represented with like reference numerals. In the illustrated embodiment, the powered tracks 12 and dolly 14 are coupled to a power tool, such as a table saw 614. In other embodiments, the powered tracks 12 may be directly coupled to the table saw 614 and may not include the dolly 14. The table saw 614 includes a base 618 that is removably coupled to the base 18 of the dolly 14. In other embodiments, the table saw 614 may be coupled to the vertical supports 22 of the dolly 14. The table saw 614 may be coupled to the base 18 in a variety of ways, such as fasteners, clips, catch and hooks, and the like. The table saw 614 includes a motor 622 that drives a saw blade 626 that cuts into a workpiece. The table saw 614 may be removed from the dolly 14 and placed on a higher horizontal surface, such as a table, to perform a cutting operation. In other embodiments, the tool support 610 (with or without the dolly 14) may be coupled to other types of power tools.

The tool support 610 is capable of transporting the table saw 614 in a similar way as described above with reference to the tool support 110 coupled to the sewer cleaning machine 114. As such, the tool support 610 may transport the table saw 614 over a relatively flat surface, up and down stairs, and onto higher ledges.

In other embodiments, the tool support 10 may be coupled to other types of tools. For example, the tool support 10 may be coupled to material movers, plate compactors, energy storage systems, breakers, breaker carts, multi-tool holders/stands (e.g., miter saws, table saws, etc.), sewer cameras, air compressors/tanks, pipe threaders, shingle movers, water jetters, and concrete saws. For each tool, the tool may include a primary motor to drive/operate the tool, and a second motor to drive the powered tracks 12. As such, the tool support 10 may transport any of the above mentioned tools over a relatively flat surface, up and down stairs, and onto higher ledges.

Figure 11:
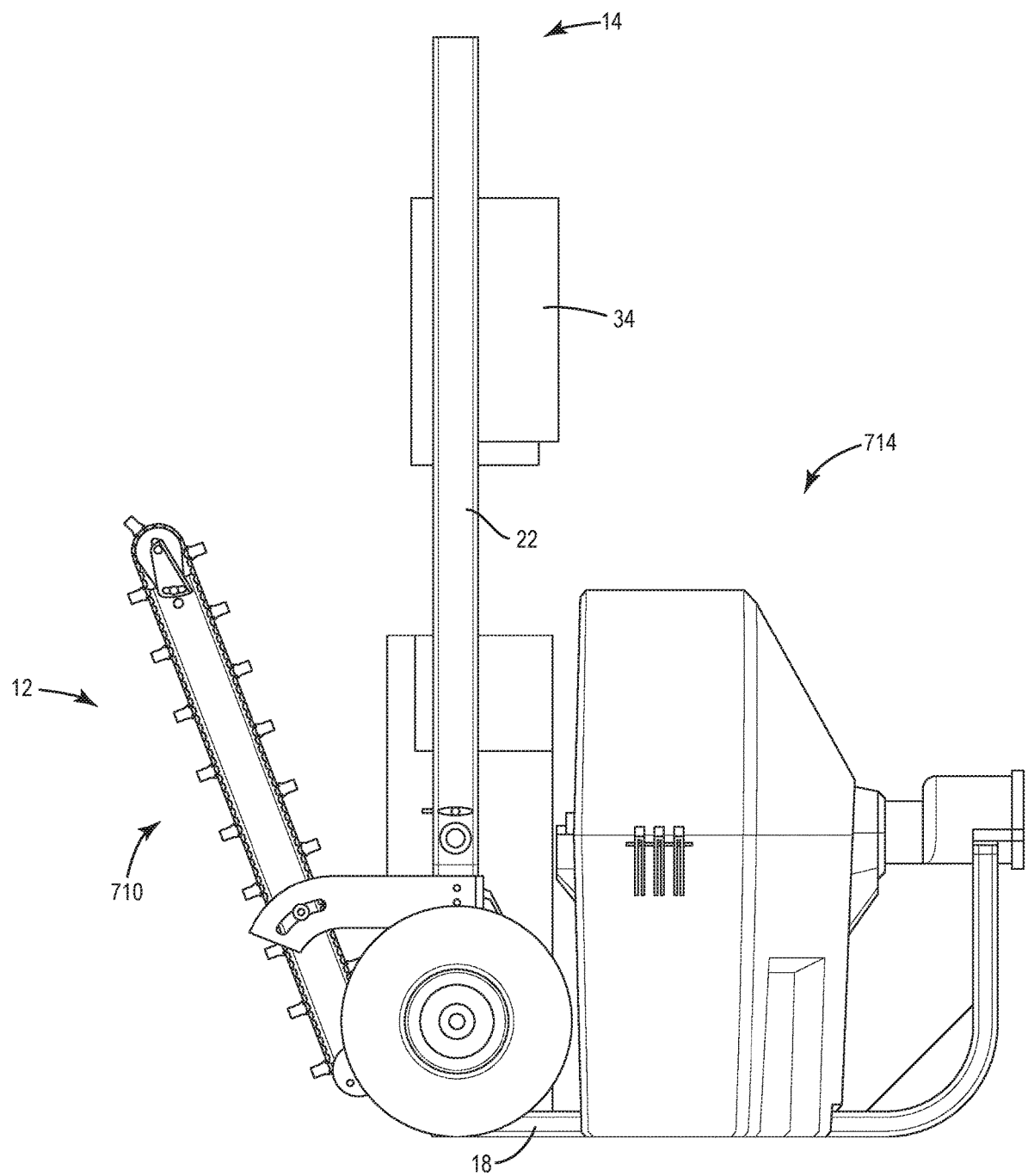
FIG. 11 is a side view of another embodiment of a tool support.

FIG. 11 illustrates another embodiment of a tool support 710. The tool support 710 is similar to the tool support 10 described above, with like features being represented with like reference numerals. In the illustrated embodiment, the tool support 710 includes powered tracks 12 that are configured to pivot between a use configuration and a non-use configuration. In the use configuration, the powered tracks 12 are pivoted relative to the dolly 14 or associated tool. In some embodiments, the powered tracks 12 are movable to an incline between 20-45 degrees relative to the dolly 14 or associated tool. The powered tracks 12 may be manually moved to the use configuration by a user or may be automatically moved to the use configuration by a motor. The motor may be the same motor that powers the tracks 12 or may be a separate, dedicated motor. The motor is controlled by a controller on the power supply 34. The incline of the powered tracks 12 in the use configuration assists the powered tracks 12 for climbing inclined surfaces. Although the powered tracks 12 are shown in the use configuration on a sewer cleaning machine 714, the powered tracks 12 may be movable to the use position on other types of tools or storage containers.

Figure 12:
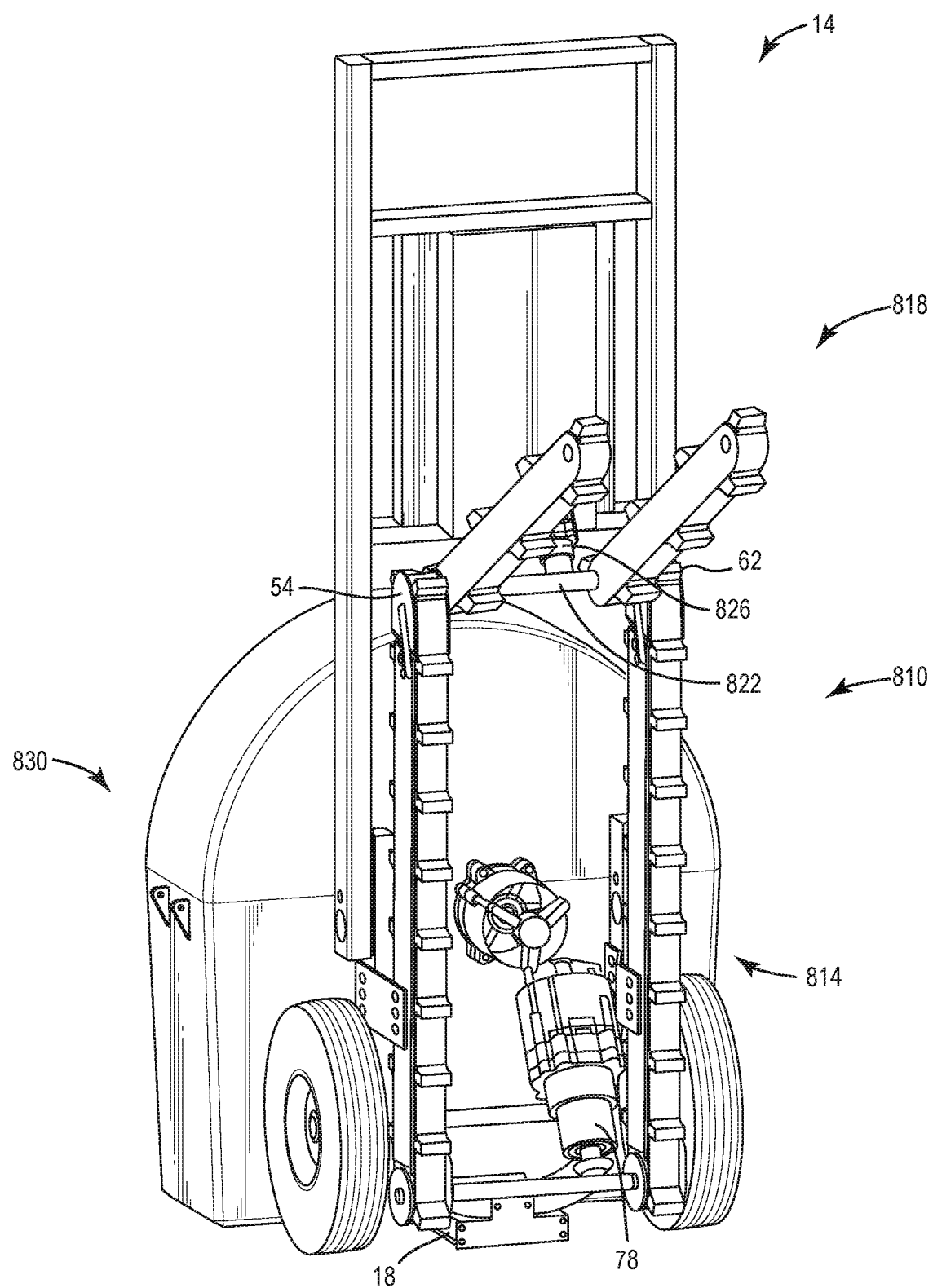
FIG. 12 is a perspective view of another embodiment of a tool support.

FIG. 12 illustrates another embodiment of a tool support 810. The tool support 810 is similar to the tool support 10 described above, but includes primary powered tracks 814 and secondary powered tracks 818. The primary powered tracks 814 are identical to the powered tracks 12 described above in reference to FIGS. 1-3, with like features being represented by like reference numerals. The secondary powered tracks 818 are also similar to the powered tracks 12 above, but are generally shorter in length. The secondary powered tracks 818 include a second drive shaft 822 that is powered by a second motor 826 to rotate the drive shaft 822 and, thus, the secondary powered tracks 818. In other embodiments, the secondary powered tracks 818 may be driven by the same motor 78 as the primary powered tracks 814. The secondary powered tracks 818 are coupled to the primary powered tracks 814 adjacent the first and second idler rollers 54, 62 and extend further vertically than the primary powered tracks 814. In the illustrated embodiment, the secondary powered tracks 818 are inclined relative to the primary powered tracks 814. The secondary powered tracks 818 can be used to initiate climbing a tool onto a taller ledge, such as a truck bed. The secondary powered tracks 818 pull the dolly 14 or a tool into a position that the primary powered tracks 814 can engage a ledge to finish pulling the tool onto the ledge. In some embodiments, the secondary powered tracks 818 may extend/retract and/or pivot to move out of the way of the primary powered tracks 814 when not in use. Although the tool support 810 is shown on a sewer cleaning machine 830, the tool support 810 may be movable to the use position on other tools.

In another embodiment, the powered tracks 12 can slide relative to the dolly 14 or associated tool in a vertical direction as viewed from FIGS. 1-3. Moving the powered tracks 12 relative to the center of gravity of the tool helps the powered tracks 12 move the tool onto taller ledges, such as a truck bed.

Although the tool supports 10, 110, 210, 310, 410, 510, 610, 710, 810, 818 are described above and illustrated in the drawings as two separate tracks, in other embodiments the powered tracks may include fewer or more tracks. For example, the powered tracks may include three or more tracks. Alternatively, the powered tracks may include a single track. In such embodiments, the single track may be a wider track.

Providing tools with a tool support 10 advantageously assists in the transportation of heavy and bulky tools. The tool support 10 assists in carrying heavy and bulky tools over relatively flat surfaces, up and down stairs, and onto taller ledges.

Various features and advantages of the invention are set forth in the following claims.

What is claimed is:

1. A tool support comprising:
   a frame configured to support a tool;
   a powered track supported on the frame, the powered track including a drive roller, an idler roller, and an endless belt that extends around the drive roller and the idler roller;
   a first motor supported on the frame, the first motor operable to drive the drive roller and rotate the endless belt; and
   a second motor supported by the frame, the second motor configured to be coupled to the tool to drive the tool supported on the frame,
   wherein the first motor and the second motor do not operate simultaneously.

2. The tool support of claim 1, wherein the frame includes a base configured to support the tool and a vertical support.

3. The tool support of claim 2, wherein the powered track extends along a length of the vertical support.

4. The tool support of claim 1, wherein the frame includes one or more wheels to transport the frame.

5. The tool support of claim 1, wherein the powered track is a first powered track, and the tool support further comprises a second powered track supported on the frame, the second powered track including a drive roller, an idler roller, and an endless belt that extends around the drive roller and the idler roller.

6. The tool support of claim 1, wherein the frame is moveable between a first position, where the powered track does not contact a surface, and a second position, where the powered track contacts a surface for movement on the surface.

7. The tool support of claim 6, wherein the frame includes a handle to move the frame from the first position to the second position.

8. The tool support of claim 1, further comprising a power supply supported on the frame, the power supply operable to power the first motor, the second motor, or both.

9. The tool support of claim 1, wherein the powered track is pivotable relative to the frame between a first position and a second position.

10. A tool support comprising:
    a frame configured to support a tool;
    a powered track supported on the frame, the powered track including a drive roller, an idler roller, and an endless belt that extends around the drive roller and the idler roller, the powered track pivotable relative to the frame between a first position and a second position;
    a first motor supported by the frame, the first motor operable to drive the drive roller and rotate the powered track;
    a second motor supported by the frame, the second motor configured to be coupled to the tool to drive the tool supported on the frame; and
    a power supply supported by the frame, the power supply operable to power the first motor and the second motor,
    wherein the first motor and the second motor do not operate simultaneously.

11. The tool support of claim 10, wherein the powered track is pivotable to an incline between approximately 20 degrees and approximately 45 degrees relative to the frame.

12. The tool support of claim 10, wherein the powered track is a first powered track, and the tool support further comprises a second powered track coupled to the first powered track.

13. The tool support of claim 12, wherein the motor is a first motor to drive the first powered track, and the tool support further comprises a second motor to drive the second powered track.

14. The tool support of claim 12, wherein the second powered track is shorter in length than the first powered track.

15. The tool support of claim 12, wherein the second powered track is inclined relative to the first powered track.

* * * * *